Sept. 1, 1925. 1,552,387
J. R. MARCHESSEAULT
ELECTRICAL HEATING UNIT
Filed Feb. 24, 1925 2 Sheets-Sheet 1
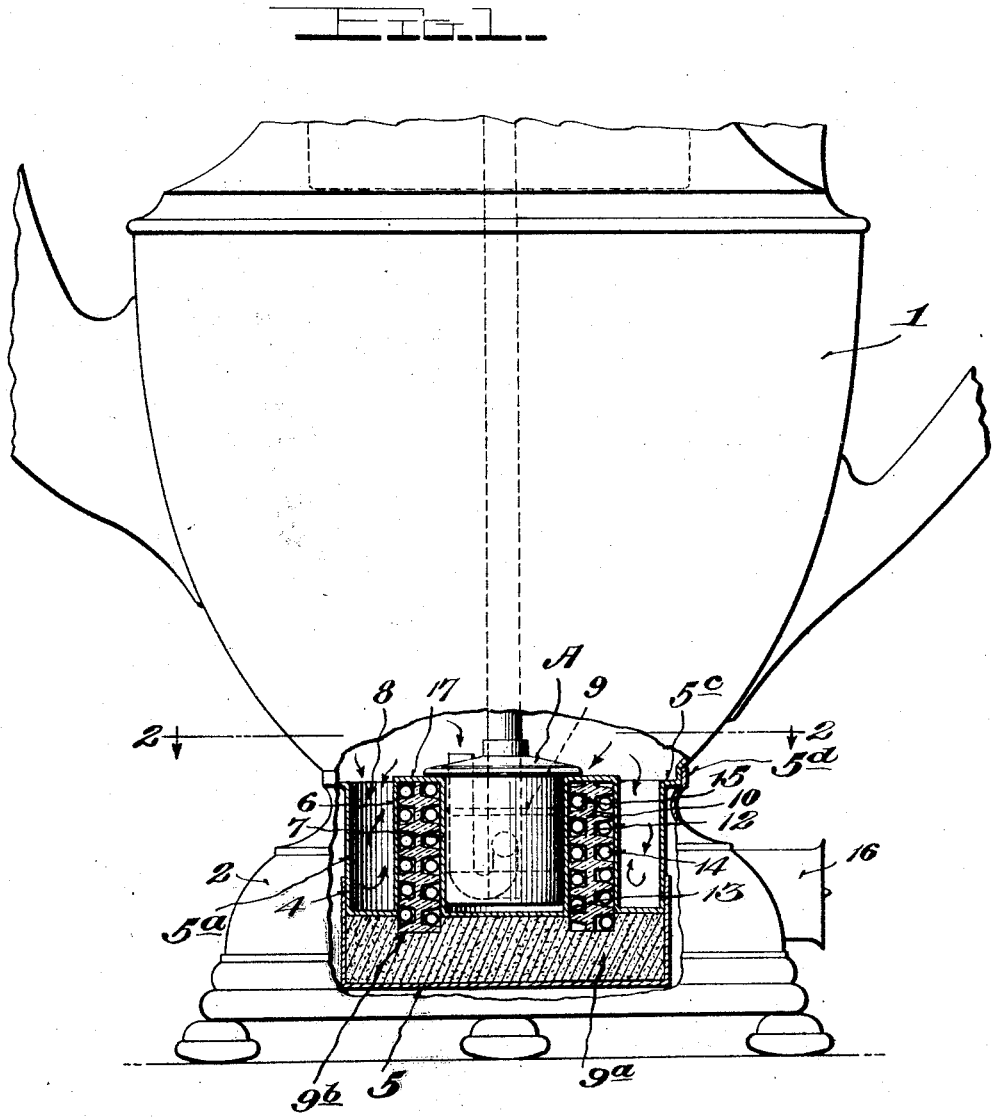
Inventor
Joseph R. Marchesseault
By Joseph A. Miller
Attorney Sept. 1, 1925.  
J. R. MARCHESSEAULT  
1,552,387  
ELECTRICAL HEATING UNIT  
Filed Feb. 24, 1925  
2 Sheets-Sheet 2
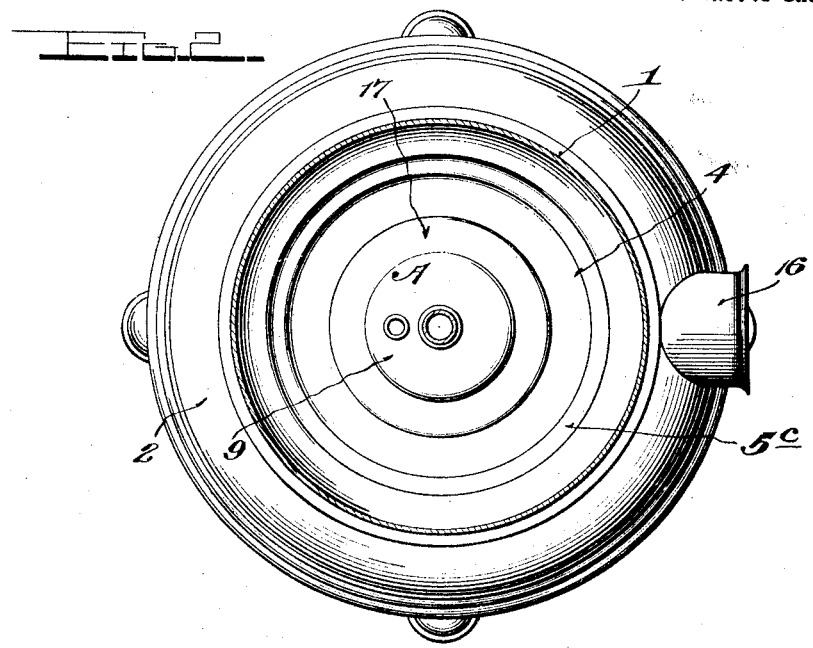
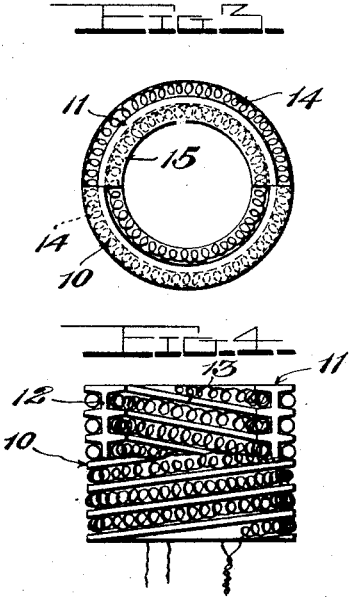
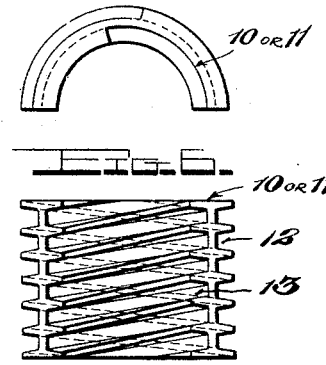
Inventor  
Joseph R. Marchesseault  
By Joseph A. Miller  
Attorney Patented Sept. 1, 1925.

1,552,387

UNITED STATES PATENT OFFICE.

JOSEPH ROI MARCHESSEAULT, OF CRANSTON, RHODE ISLAND, ASSIGNOR TO GORHAM MFG. CO., OF PROVIDENCE, RHODE ISLAND.

ELECTRICAL HEATING UNIT.

Application filed February 24, 1925. Serial No. 11,043.

*To all whom it may concern:*

Be it known that I, JOSEPH R. MARCHESSEAULT, a citizen of the United States, residing at Auburn, in the city of Cranston, county of Providence, and State of Rhode Island, have invented new and useful Improvements in Electrical Heating Units, of which the following is a specification.

This invention relates to certain new and useful improvements in electrical heating units and pertains more particularly to a unit employed in connection with vessels.

The primary object of the invention is to provide an electrical heater which is incorporated in the vessel so as to be disposed entirely below the bottom of the vessel and to also eliminate all possibility of leakage, by leaving the vessel intact.

A further object of the invention is to provide an electrically heated vessel which enables smaller vessels containing foods such as cereals, custards, etc., to be received in the main vessel and cooked by the heating means of the latter.

A still further object of the invention, is to provide a heater which can be regulated to increase or decrease the heat and one which is of simple, economical and compact construction and wherein the parts can be easily and quickly renewed in case of injury or damage.

Another object of the invention is to provide a structure of this kind wherein the parts are readily accessible for purpose of repair or replacement of the parts.

In the drawings:—

Figure 1 is a side elevation, partly broken away and in section;

Figure 2 is a section on line 2—2 of Fig. 1;

Figure 3 is a top plan view of the insulating core with the resistance wires thereon;

Figure 4 is a side elevation of Figure 3, partly broken away and in section;

Figure 5 is an end elevation of one of the core sections and

Figure 6 is a side elevation of one of the core sections.

In proceeding in accordance with the present invention, a vessel 1, here shown for example as a percolator, is provided with a separate base 2 which projects below the bottom of the vessel and which houses the heating means. The base 2 is hollow and has a removable cuplike member therein provided with a circumferential wall 4 and a bottom 5. A circular casing $5^a$ carried by the vessel 1, is fitted in the wall 4 and is formed with a pair of spaced and preferably integral ring-like members 6 and 7 connected at the top by the ring 17 preferably formed integral therewith.

The outer member 6 is spaced from the circumferential wall of the casing $5^a$ to form an outer heating chamber 8, while the space defined by the inner member 7 constitutes an inner heating chamber 9. Heat insulation $9^a$ is placed in the bottom 5 of the cup and is formed with a circular channel $9^b$.

The casing $5^a$ is preferably formed integral with the vessel 1 being connected thereto by the offset flange $5^c$, while the base 2 has a flange $5^d$ which frictionally fits over the offset flange $5^c$.

The core for supporting the heating or resistance wires is of hollow cylindrical form and is preferably made in two sections 10 and 11, the peripheries and inner circumferences of which are formed with helical grooves 12 and 13, which latter are formed clockwise and counterclockwise. The coiled wires 14 and 15 are spirally formed and seat snugly in the grooves formed for their reception, the ends of the wires being led into a socket 16 for connection to the source of current supply, as is well understood in the art. The core is received in a chamber formed between the members 6 and 7, which chamber has a downwardly opening bottom, enabling removal and replacement of the core through the open bottom. The lower end of the core is received in the channel $9^b$ and is supported thereby.

From the foregoing it will be seen that the ring or top plate 17, affords, a supporting seat for the bottom of a vessel, containing custard, or other food, which may be placed within the main vessel and cooked. In addition, the inner chamber 9, affords a retainer for the lower end of the tube and valve structure of a percolator the subject matter of which structure is reserved for a future application.

Since the entire heating structure is located below the bottom of the vessel, it will also be apparent that the capacity of the vessel is in no way decreased and in addition, and due to the fact that the heating means is carried in its entirety by the base of the vessel, the heating means is not only concealed, but does not interfere with free access to the vessel interior and especially as concerns cleaning of its sides.

The base 2 can be easily and quickly removed from the vessel, whereupon the cup 5 can be removed with the insulation, from the casing 5a and the cores and heating wires then are readily accessible for purpose of repair, etc.

Having thus described my invention what I claim as new and desire to secure by Letters Patent is:—

1. In combination with a vessel having a hollow base depending from its bottom, a cup in the base, insulation in the bottom of the cup having a circular channel in its upper face, a casing seated on the insulation, and received in the cup, an outer ring-like member in the casing spaced from the sides of the same to form an outer heating chamber in conjunction therewith, an inner ring-like member to form a channel in conjunction therewith, a sectional core of insulation in said channel received at its lower end in said channel and having clockwise and counter-clockwise grooves on the respective inner and outer circumferential faces of the sections, coiled heat resistance wires in the grooves, means for connecting the wires in an electric circuit.

2. In combination with a vessel having a hollow base depending from its bottom, a cup in the base, insulation in the bottom of the cup, a casing seated on the insulation and received in the cup, an outer ring-like member in the casing spaced from the sides of the same to form an outer heating chamber in conjunction therewith, an inner ring-like member in the casing forming an inner heating chamber, and spaced from the outer ring-like member to form a channel in conjunction therewith, a ring-like core of insulation in the last named channel, heating means carried by the core, and means for connecting the heating means in an electric circuit.

3. In combination with a vessel, a depending base therefor having an inner and an outer heating chamber each open at its top and with each of the tops in the plane of the bottom of the vessel, electrical heating means interposed between the chambers, and means to connect the heating means in an electric circuit.

4. In combination with a vessel, a hollow base therefor, a casing in the base having spaced inner and outer rings and having their upper ends forming a support for the bottom of a vessel, the outer ring being spaced from the side walls of the casing to form an outer heating chamber and the interior of the inner ring forming an inner heating chamber, and heating means interposed between the rings.

5. In combination with a vessel having a hollow base, an inner and an outer heating chamber in the base having their upper ends substantially alined with the bottom of the vessel and each opening into the interior of the vessel, and means to supply heat to and between the chambers.

6. In combination with a vessel, a casing integral with the vessel and forming the bottom thereof and having a chamber formed with a downwardly opening bottom part, a core to heat the vessel disposed in said chamber and removable through the open bottom of the chamber, and a removable cup engaged over the casing and with the core to removably hold the core in the chamber.

7. In combination with a vessel, a hollow base depending from the bottom of the vessel and having spaced heating chambers, and electrical heating means in the hollow base disposed between the heating chambers and entirely below the vessel bottom.

8. In combination with a vessel having a bottom formed with spaced heating chambers each opening into the vessel interior and with a downwardly opening chamber between the first named chambers, heating means in the downwardly opening chamber, and means to removably hold the heating means in the downwardly opening chamber.

9. In combination with a vessel, a hollow base depending from the vessel bottom and having inner and outer heating chambers therein, and electrical means to heat the chambers interposed between said chambers.

10. In combination with a vessel having a hollow depending base, inner and outer heating chambers in the base disposed below the vessel bottom, and electrical heating means for the chambers interposed therebetween.

11. In combination with a vessel having a depending chamber, heating means in the said chamber removable from the bottom thereof, means to removably hold the heating means in said chamber, and a base removably connected to the vessel and containing said chamber and said holding means.

12. In combination with a vessel having a depending chamber formed with a downwardly opening part heating means removably mounted in said part, a cup removably connected to the chamber and having insulation therein for supporting the heating means and a base removably connected to the vessel and containing said chamber and cup.

13. In combination with a vessel, a casing depending from the bottom of the vessel, and having a heating chamber on its interior and a second chamber, electric heating means removably mounted in the second chamber, a cup-like member removably connected to the casing to hold the heating means in the second chamber, and a base removably connected to the vessel and receiving said cup-like member on its interior.

14. In combination with a vessel having a casing depending from its bottom, electric heating means removably mounted in the casing and removable from the bottom of the casing, a cup removably mounted on the casing to hold the heating means therein, and a base receiving the cup therein and having a flange removably engaged with the vessel, whereby upon removal of the base, the cup and then the heating means may be removed.

15. In combination with a vessel having an imperforate bottom, a member depending from the bottom and having an upwardly opening hollow part and a downwardly opening hollow part, and electric heating means removably mounted in the downwardly opening hollow part so as to be removable from beneath the bottom of the vessel.

In testimony whereof I have signed my name to this specification.

JOSEPH ROI MARCHESSEAULT.